United States Patent Office 3,639,656
Patented Feb. 1, 1972

3,639,656
FORMATION OF POLYPHENYLENE ETHERS
James G. Bennett, Menands, and Glenn D. Cooper, Delmar, N.Y., assignors to General Electric Company
No Drawing. Filed Mar. 13, 1969, Ser. No. 807,126
Int. Cl. C08g 23/18
U.S. Cl. 260—47 ET    8 Claims

ABSTRACT OF THE DISCLOSURE

A process for the formation of high molecular weight polyphenylene ethers by the oxidative coupling of a phenolic precursor in the presence of a catalyst comprising an anhydrous non-basic cupric salt and a primary or secondary amine. The process is characterized by the choice of catalyst which provides high molecular weight polymer in a given reaction time or substantially decreased reaction time.

BACKGROUND OF THE INVENTION (1) Field of the invention

This invention relates to the formation of synthetic polymers from phenolic precursors, and more particularly, to the formation of polyphenylene ethers by the self-condensation of phenols in the presence of a catalyst comprising an anhydrous, non-basic cupric salt and a primary or secondary amine.

(2) Description of the prior art

The polyphenylene ethers and processes for their formation are known in the art and described in numerous publications including United States Patents Nos. 3,306,874 and 3,306,875 of Allan S. Hay, and 3,384,619 of Takeshi Hori et al., all incorporated herein by reference.

The process of the aforesaid Hay Patent No. 3,306,875 involves the self-condensation of a monovalent phenolic precursor using a catalyst comprising a tertiary amine-basic cupric salt complex. The phenols which may be polymerized by the process correspond to the following structural formula.

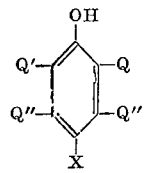

where X is a substituent selected from the group consisting of hydrogen, chlorine, bromine and iodine; Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus; and Q' and Q'' are the same as Q and in addition, halogen with the proviso that Q, Q' and Q'' are all free of a tertiary alpha-carbon atom.

Polymers formed from the above-noted phenols will correspond to the following structural formula:

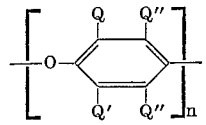

where the oxygen ether atom of one repeating unit is connected to the phenylene nucleus of the next repeating unit; Q, Q' and Q'' are as above defined; and $n$ is a whole integer equal to at least 100.

According to the process of Hay, the formation of the polyphenylene ethers involves the self-condensation of a phenol in the presence of a catalyst system comprising a tertiary amine-basic cupric salt complex. It is disclosed that the copper salt used to form the complex catalyst is not critical and may be either a basic-cupric salt or a cuprous salt providing that if a cuprous salt is used, it must be capable of existing in the cupric state. When a cuprous salt is used, the catalyst is said to form by oxygen and water reacting with an intermediate tertiary amine-cuprous salt complex thereby forming a tertiary amine-basic cupric salt complex. Various methods are reported for forming the complex catalyst starting with a cupric salt. For example, it is reported that a reducing agent may be used with a cupric salt to form the cuprous salt in situ, which in turn, forms the tertiary amine-basic cupric salt complex when admixed with the amine. Alternatively, it is reported that the complex can be formed from the tertiary amine with a basic cupric salt formed by reacting a cupric salt with an alkaline salt of a phenol, by treating a cupric salt with an ion exchange resin having exchangeable hydroxyl groups, by adding a base to a cupric salt or by adding cupric hydroxide to a cupric salt. United States Pat. No. 3,306,874 of Hay is similar except that primary and secondary amines are used in place of the tertiary amines.

The above-noted United States Pat. No. 3,384,619 of Hori et al. is also for a process for the self-condensation of phenols to high molecular weight polyphenylene ethers but differs from the Hay patents in that a catalyst is used comprising a tertiary amine and a non-basic cupric halide. It is reported that the reaction must be performed in a solvent system containing at least 5 weight percent alcohol in order to obtain high molecular weight polymer. Moreover, in the Hori et al. process, the catalyst concentration in the reaction mixture is excessively high, typically 9 parts amine to 1 part phenol, thereby making the overall process very expensive and commercially undesirable.

STATEMENT OF THE INVENTION

The invention described herein is an improved process for the self-condensation of phenols to high molecular weight polyphenylene ethers using a complex catalyst formed from a primary or secondary amine and an anhydrous non-basic cupric salt. The process is an improvement over that of the Hori et al. patent in that the concentration of catalyst components is small relative to the concentration of monomer and consequently the overall cost of the process is substantially reduced. The process of the invention is also an improvement over other processes in that the molecular weight of the polyphenylene ether formed is higher than otherwise obtainable in a given reaction time, or alternatively, the reaction time is shorter for recovery of polymer of comparable molecular weight. Finally, alcohol is not required for the formation of high molecular weight polymer.

DESCRIPTION OF THE PREFERRED EMBODIMENTS

Polymer is formed in accordance with the invention by passing an oxygen-containing gas through a solution containing the phenolic monomer and the catalyst formed from the primary or secondary amine and the cupric salt dissolved in a solvent. The process is broadly applicable to those phenols disclosed in the above-noted Hay patents, but is preferably used with phenols corresponding to the following formula:

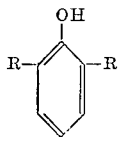

where each R represents a hydrocarbon preferably having from 1 to 8 carbon atoms. Examples of preferred phenols include 2,6-dimethyl phenol, 2,6-diethyl phenol, 2-methyl-6-ethyl phenol, 2,6-dibutyl phenol, 2-methyl-6-propyl phenol, 2-methyl-6-phenyl phenol and 2-methyl-6-allyl phenol. The most preferred phenol is 2,6-dimethyl phenol.

The primary or secondary amine component of the catalyst complex corresponds to those disclosed in the above-noted United States Pat. No. 3,306,874, representative examples including aliphatic amines including cycloaliphatic amines where the cycloaliphatic group is substituted on the amine nitrogen, for example, mono- and dipropyl amine, mono- and dibutyl amine, mono- and disecondary propylamine, mono- and dicyclohexylamine, ethylmethylamine, morpholine, methylcyclohexylamine, N,N'-dialkylethylenediamines, N,N,N'-trialkylethylenediamine, the N,N'-dialkylpropanediamines, the N,N,N'-trialkylpentanediamines, etc.

Obviously, mixtures of primary and secondary amines may be used if desired. Lower, straight chained dialkylmonoamines are preferred. The concentration of amine in the reaction mixture may vary within wide limits, but is desirably added in low concentrations. A preferred range comprises from about 2.0 to 25.0 moles per 100 moles of monomer.

Typical examples of cupric salts suitable for the process include cupric chloride, cupric bromide, cupric sulfate, cupric azide, cupric tetrammine sulfate, cupric acetate, cupric butyrate, cupric toluate, etc. Preferred cupric salts are the cupric halides, cupric bromide being most preferred. The concentration of the cupric salt is desirably maintained low and preferably varies from about 0.2 to 2.5 moles per 100 moles of phenolic monomer.

It is necessary that the no-basic cupric salt used to form the complex catalyst be in its anhydrous form rather than in a hydrated form. This is based upon the observation that slight quantities of water present in the system prior to formation of the complex of the amine and the non-basic cupric salt is highly detrimental to the reaction and results in the formation of a catalyst complex of substantially reduced activity. For example, it has been observed that with a complex catalyst formed from cupric chloride dihydrate and an amine, polymer is formed having an intrinsic viscosity less than approximately 50% of that of a polymer formed using a catalyst prepared from an amine and an anhydrous cupric chloride. This is surprising as water formed during the polymerization reaction is present in much greater quantities than that in the system due to a hydrated cupric salt. It is noted that it is reported in the prior art that attempts to make polyphenylene ethers using non-basic cupric salts have been unsuccessful. It is believed that the failure of the prior art is due to the use of hydrated cupric salts.

The polymerization reaction is performed in a solvent of the general class disclosed in the Hay patent above-noted, aromatic solvents such as benzene and toluene providing best results. In addition, the reaction mixture may contain a promoter such as a diaryl guanidine as disclosed in copending United States Pat. application Ser. No. 806,929, now U.S. Patent No. 3,544,515 or diaryl formamidine as disclosed in copending United States Patent application Ser. No. 807,047, now U.S. Patent No. 3,544,516. In other aspects, the process for forming polymer and the conditions therefor such as temperature, oxygen flow rate and the like are essentially the same as the conditions disclosed in the above-noted Hay patents, though reaction time to generate high molecular weight polymer is reduced. The above-noted concentration ranges are preferred, though these ranges may vary to some extent dependent upon oxygen flow rate, reaction temperature and the like. For purposes of economy, lower concentrations of cupric salts and amine are preferred. It is characteristic of the subject invention that the use of the complex catalyst formed from a primary or secondary amine and an anhydrous non-basic cupric salt permits formation of high molecular weight polymer with lower concentration of cupric salt and amine than would otherwise be permissible. The invention will be more fully illustrated by the following examples.

Example 1

A complex catalyst was prepared in 100 ml. of toluene by stirring together 0.76 grams of anhydrous cupric chloride, 10.9 grams of di-n-butyl amine, and 4 ml. of a 55% by weight solution of 2,6-xylenol dissolved in toluene. The catalyst complex so prepared was transferred to a one liter flask equipped with cooling coils, thermometer well, and inlet tubes for oxygen and monomer. Following preparation of the catalyst, 400 ml. of toluene were added and the mixture was stirred at 1500 r.p.m. by a single 2″ x ¼″ turbine stirrer while oxygen was introduced to the reaction mixture at a rate of 1.0 cubic feet per hour. Thereafter, 123 grams of a 55% solution of 2,6-xylenol dissolved in toluene were added over a period of 8 minutes. Temperature was maintained throughout the reaction period at 30° C. by circulating water from a constant temperature bath through the coils in the reaction mixture. After one hour and 45 minutes the temperature was increased to 35° C. and 15 minutes thereafter, 30 ml. of a 50% by weight aqueous acetic acid solution was added to kill the reaction. The mixture was centrifuged and the polymer precipitated from the upper toluene phase by the addition of methanol. The polymer was filtered off, washed with methanol, and dried at 70° C. under vacuum, yielding 65.6 grams of poly-(2,6-dimethyl-1,4-phenylene) ether having an intrinsic viscosity of 0.46 deciliters per gram (dl./g.) as measured in chloroform at 30° C. The polymer was molded at 570° F. into a tough, flexible, nearly colorless film.

Example 2

For purposes of comparison, the procedure of Example 1 was repeated using a complex catalyst formed from a basic cupric chloride. The complex catalyst was prepared in 100 milliliters of toluene by stirring together 0.76 grams of anhydrous cupric chloride, 10.9 grams of di-n-butylamine, 0.32 grams of potassium hydroxide dissolved in 6 milliliters of methanol, and 4 milliliters of a 55% solution of 2,6-xylenol dissolved in toluene. Following the procedure of Example 1, the polymer recovered weighed 62.2 grams and had an intrinsic viscosity of 0.16 dl./g. as compared to an intrinsic viscosity of 0.46 dl./g. of the polymer recovered from Example 1.

Example 3

The procedure of Example 1 was repeated except that 0.56 grams of cuprous chloride were substituted for cupric chloride in the formation of the complex catalyst. The polymer recovered from the reaction solution weighed 34.9 grams and had an intrinsic viscosity of 0.09 dl./g. as compared to 65.6 grams of polymer in Example 1 having had an intrinsic viscosity of 0.46 dl./g.

Example 4

The procedure of Example 1 was repeated except that 0.96 grams of cupric chloride dihydrate was substituted for the anhydrous cupric chloride. The yield of polymer was 27.5 grams, with an intrinsic viscosity of only 0.09 dl./g., as compared to a yield of 65.6 grams with an intrinsic viscosity of 0.46 dl./g., when the anhydrous salt was used.

Example 5

To a tube type reaction vessel equipped with a Vibro-Mixer stirrer, thermometer, and an oxygen inlet tube, there were added 120 ml. of toluene, 1.29 grams of di-n-butyl amine and 0.223 grams (0.01 moles) of anhydrous cupric bromide. The mixture was stirred and 10.0 grams of 2,6-xylenol dissolved in 20 milliliters of toluene were added. Oxygen was passed through the stirred reaction mixture for a period of approximately 120 minutes while maintaining reaction temperature at 25° C. The polymerization reaction was terminated with acetic acid, the acid layer removed and the polymer precipitated with methanol. The polymer, reslurried with methanol and vacuum dried, weighed 9.5 grams (97.0 of theoretical) and had an intrinsic viscosity of 0.66 dl./g.

Example 6

The procedure of Example 5 was repeated with the substitution of 1.3 ml. of N-methylcyclohexylamine for the di-n-butyl amine. Polymer yield was 92.8% of theoretical with an intrinsic viscosity of 0.78 dl./g.

Example 7

The procedure of Example 5 was repeated with a catalyst formed from 0.144 grams (0.001 moles) cuprous bromide and 1.3 ml. (0.010 moles) of N-methylcyclohexylamine. Polymer was recovered in a yield of 91.8% of theoretical and had an intrinsic viscosity of 0.48 dl./g.

Example 8

The procedure of Example 5 was repeated with the substitution of 1.85 grams of tri-n-butylamine for dibutylamine. Precipitation with methanol yielded only a trace of gummy polymer of very low molecular weight.

Example 9

The procedure of Example 5 was repeated except that 0.73 grams of n-butylamine was substituted for the di-n-butylamine. A 92% yield of polymer having an intrinsic viscosity of 0.44 dl./g. was obtained.

Example 10

A round-bottomed flask was equipped with a Vibro-Mixer, condenser and oxygen inlet tube. To this flask was added 280 ml. of toluene, 20.0 grams of 2,6-xylenol and 2.06 ml. (0.020 moles) of diethylamine. The flask was immersed in a constant temperature bath maintained at 25° C. After stirring for five minutes, 0.446 grams (0.002 moles) of anhydrous cupric bromide were added. Oxygen was passed through the stirred reaction mixture over a period of 6 hours. The polymerization was terminated with the addition of acetic acid, the acid layer was removed and the polymer precipitated by the addition of methanol. A yield of 18.4 grams of polymer (94% of theoretical) was obtained having an intrinsic viscosity of 0.68 dl./g.

Example 11

The procedure of Example 10 was repeated with the substitution of 0.290 grams (0.002 moles) of cuprous bromide for cupric bromide. Polymer was recovered in a yield of 89% of theoretical and had an intrinsic viscosity of 0.28 dl./g.

It should be understood that changes may be made in the embodiments above described without departing from the invention as defined by the following claims.

What is claimed is:

1. A process for the formation of a polyphenylene ether corresponding to the formula

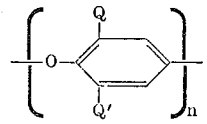

where Q and Q' are each hydrocarbon having from one to eight carbon atoms and $n$ is a whole integer equal to at least 100 from the corresponding monovalent phenol which comprises
   (a) forming a complex catalyst consisting essentially of a primary or secondary alkyl mono- or diamine and an anhydrous, non-basic cupric halide; and
   (b) oxidatively coupling said monovalent phenol in a solvent in the presence of said catalyst and in the absence of an alcohol and wherein the amine comprises from about 2.0 to 25.0 moles per 100 moles of phenolic monomer and the cupric halides comprises from about 0.2 to 2.5 moles per 100 moles of monomer.

2. The process of claim 1 where Q and Q' are each methyl.

3. The process of claim 2 where the anhydrous, non-basic cupric salt is cupric chloride.

4. The process of claim 2 where the anhydrous, non-basic cupric salt is cupric bromide.

5. The process of claim 2 where the amine is an aliphatic monoamine.

6. The process of claim 2 where the amine is di-n-butyl amine.

7. The process of claim 2 where the amine is diethyl amine.

8. The process of claim 2 where the amine is a monoalkylamine.

References Cited

UNITED STATES PATENTS

| | | | |
|---|---|---|---|
| 3,306,874 | 2/1967 | Hay | 260—47 |
| 3,306,875 | 2/1967 | Hay | 260—47 |
| 3,384,619 | 5/1968 | Hori et al. | 260—47 |

MELVIN GOLDSTEIN, Primary Examiner